G. W. N. YOST.
Whiffletree.
No. 87,612. Patented March 9, 1869.
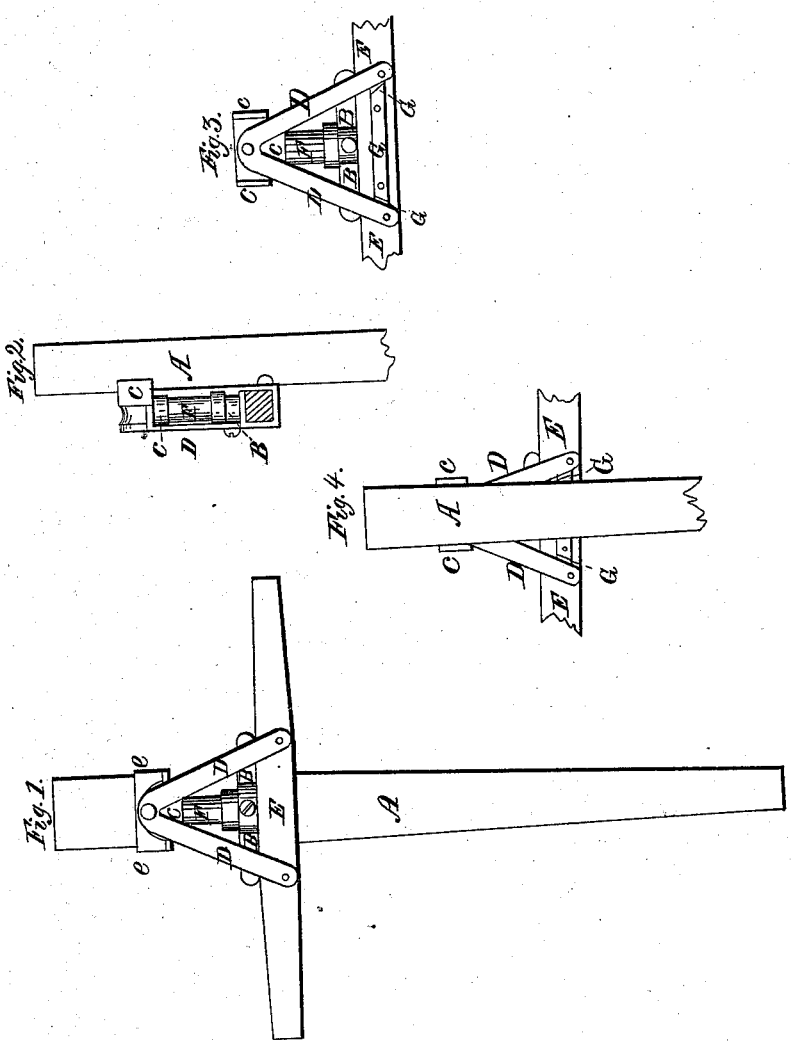

GEORGE W. N. YOST, OF CORRY, PENNSYLVANIA.

Letters Patent No. 87,612, dated March 9, 1869.

IMPROVEMENT IN EQUALIZERS.

The Schedule referred to in these Letters Patent and making part of the same.

*To all interested:*

I, GEORGE W. N. YOST, of Corry, Pennsylvania, have invented a Climax Whiffle-Tree Buffer, and an Improved Stay for Draught-Whiffle-Trees.

In the operation of hauling substances by animal-teams, if the thing hauled impinge against any unyielding obstacle, the team is more or less affected exhaustively by the shock of such impingement, and more or less extra strain and breakage of the harness, or draught-gearing, is consequent thereon; and one object of the invention is to provide a yielding buffer to relieve that shock and strain.

Also, in the operation of hauling by animal-teams, if the main whiffle-tree or double-tree swings or plays on a pivot in the middle, the nervous fractiousness of one or more of the animals of the team, frequently causes one to pull when another will not, and another to pull when the one will not, one going forward and another backward, in a see-saw movement, and thus wearies team and driver, and does no good.

And another object of the invention is to provide a stay to allow the whiffle-tree a certain play on the pivot, so that each animal ordinarily shall do an equal share of the work, but beyond that play, to hold the whiffle-tree rigidly, so that if either animal goes forward, whatever is to be hauled will be moved.

The accompanying drawings, and following description, will fully illustrate the invention, drawings and description having like specifying-characters.

To any common draught-tongue A, pivot and fasten a rest or socket, B, two inches wide and deep, and thick, provided with a hole, or "step," one and a half inch in diameter, and one inch deep, and with arms projecting beyond the sides of the tongue one and a half inch, all more or less.

Make a socket, C, similar in size and form to the socket, B, and put it on to the tongue, behind the socket B, and bend the arms down over the side corner-edges of the tongue into flanges or lips, to hold and guide the socket on the tongue, and permit it to slide forward and backward.

Make a strap, D, twelve inches long, one-eighth inch thick, and one inch wide, all more or less, bend it edgewise into V-form, fasten the two ends, seven inches apart, more or less, to a common whiffle-tree, E, equidistant from the middle, and pivot the apex, or bent narrow part of the V of the strap, to the socket C.

To maintain equality of pressure on all parts, it is better to make two V-form straps, and fasten one to the top and the other to the bottom of socket and whiffle-tree.

Make a buffer, F, of caoutchouc, or other elastic material, one and a half inch in diameter and three inches long, all more or less, and put it into and between the sockets B and C.

Between the open ends of the V-form strap D, and between the whiffle-tree and tongue, on to and lengthwise of the whiffle-tree, fasten the stay-strap G, with the ends next to and adjoining the ends of the V-form strap D bent to form catches or stays, to stop against the corners of the tongue, to hold the whiffle-tree from sliding any further across the tongue, and from swinging any further forward.

Thus made, in hauling a heavy thing, the whiffle-tree will pull the sliding socket C against the buffer F and the socket B, and the buffer being yielding and elastic, the shock of any sudden stoppage, from any impingement, will be relieved; and the stays G, after a certain play of the whiffle-tree, will hold it from any further swinging, and compel either animal that goes forward to haul whatever the whiffle-tree is attached to.

The nature of the invention is in providing a yielding, elastic buffer to the whiffle-trees of draught-teams, and also in providing a stay to hold the whiffle-tree rigid after a certain distance of play. Therefore,

I claim the combination of the whiffle-tree E, provided with a stay, G, and a V-form strap, D, pivoted to a slide C, with a tongue, A, provided with a socket, B, and a buffer, F, as described for draught-teams.

GEORGE W. N. YOST.

Witnesses:
FRANK H. W. GREGG,
FRED. G. CROSBY.